United States Patent
Marom Tchaicheeyan et al.

(10) Patent No.: US 11,960,241 B2
(45) Date of Patent: Apr. 16, 2024

(54) LIQUID ELECTROPHOTOGRAPHIC INK COMPOSITION

(71) Applicant: Hewlett-Packard Development Company, L.P., Spring, TX (US)

(72) Inventors: Hanit Marom Tchaicheeyan, Ness Ziona (IL); Albert Teishev, Ness Ziona (IL); Adi Mann, Ness Ziona (IL); Orel Yosef Mizrahi, Ness Ziona (IL); Doron Gurovich, Ness Ziona (IL); Vladislav Kaploun, Ness Ziona (IL); Emad Masoud, Ness Ziona (IL)

(73) Assignee: Hewlett-Packard Development Company, L.P., Spring, TX (US)

( * ) Notice: Subject to any disclaimer, the term of this patent is extended or adjusted under 35 U.S.C. 154(b) by 156 days.

(21) Appl. No.: 17/413,943

(22) PCT Filed: Apr. 30, 2019

(86) PCT No.: PCT/US2019/029908
§ 371 (c)(1),
(2) Date: Jun. 14, 2021

(87) PCT Pub. No.: WO2020/222800
PCT Pub. Date: Nov. 5, 2020

(65) Prior Publication Data
US 2022/0043364 A1 Feb. 10, 2022

(51) Int. Cl.
*G03G 9/08* (2006.01)
*G03G 9/12* (2006.01)
(Continued)

(52) U.S. Cl.
CPC ........... *G03G 9/0823* (2013.01); *G03G 9/122* (2013.01); *G03G 9/125* (2013.01); *G03G 9/131* (2013.01);
(Continued)

(58) Field of Classification Search
CPC ............................... G03G 9/122; G03G 9/125
See application file for complete search history.

(56) References Cited

U.S. PATENT DOCUMENTS

| 5,171,631 A | 12/1992 | Adkins |
| 9,394,453 B2 | 7/2016 | Ng et al. |

(Continued)

FOREIGN PATENT DOCUMENTS

| CN | 106673044 A | * | 5/2017 | ............ C01F 11/462 |
| CN | 106752318 A | | 5/2017 | |

(Continued)

OTHER PUBLICATIONS

Ellila, Mia, The use of barium sulfate in printing inks as filler material, Dec. 9, 2011, Helsinki Metropolia University of Applied Sciences, 161 pages.

*Primary Examiner* — Khanh T Nguyen
(74) *Attorney, Agent, or Firm* — Dierker & Kavanaugh, P.C.

(57) ABSTRACT

A liquid electrophotographic ink composition is disclosed herein. One example of the liquid electrophotographic ink composition includes a resin, a liquid carrier, a pigment chosen from titanium oxide, and a spacer chosen from barium sulfate, calcium carbonate, clay, magnesium silicate and mixtures thereof, in an amount from 5 to 15 wt. % of the total solids of the composition. A method for making a liquid electrophotographic ink composition is also disclosed herein.

15 Claims, 2 Drawing Sheets

(51) Int. Cl.
*G03G 9/125* (2006.01)
*G03G 9/13* (2006.01)
*G03G 9/135* (2006.01)
*B82Y 40/00* (2011.01)

(52) U.S. Cl.
CPC ............ *G03G 9/132* (2013.01); *G03G 9/135* (2013.01); *B82Y 40/00* (2013.01)

(56) References Cited

U.S. PATENT DOCUMENTS

| | | |
|---|---|---|
| 10,042,279 B2 | 8/2018 | Chun et al. |
| 2006/0025496 A1 | 2/2006 | Grandhee et al. |
| 2007/0295247 A1 | 12/2007 | Remortel et al. |
| 2017/0227878 A1* | 8/2017 | Mann .................... C09D 11/106 |
| 2018/0275548 A1 | 9/2018 | Masoud et al. |

FOREIGN PATENT DOCUMENTS

| | | |
|---|---|---|
| WO | WO-9201518 A1 | 2/1992 |
| WO | WO-2013187408 A1 | 12/2013 |
| WO | WO-2016015756 A1 | 2/2016 |
| WO | WO-2018079486 A1 | 5/2018 |

* cited by examiner

LIQUID ELECTROPHOTOGRAPHIC INK COMPOSITION

BACKGROUND

Electrophotographic printing processes, sometimes termed electrostatic printing processes, generally involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

BRIEF DESCRIPTION OF THE DRAWINGS

The drawings are provided to illustrate various examples of the subject matter described herein in this disclosure and are not intended to limit the scope of the subject matter. The drawings are not necessarily to scale.

DETAILED DESCRIPTION

Before the present disclosure is disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "carrier," or "carrier vehicle" refers to the fluid in which the resin, pigment, spacer and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" or "electrophotographic ink composition" generally refers to an ink composition, which may be in liquid form, generally suitable for use in an electrostatic printing process, sometimes termed an electrophotographic printing process. The electrostatic ink composition may include chargeable particles of the resin and the pigment dispersed in a liquid carrier, which may be as described herein.

As used herein, "copolymer" refers to a polymer that is polymerized from at least two monomers.

As used herein, "melt flow rate" generally refers to the extrusion rate of a resin through an orifice of defined dimensions at a specified temperature and load, usually reported as temperature/load, e.g. 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity," "acid number," or "acid value" refers to the mass of potassium hydroxide (KOH) in milligrams that neutralizes one gram of a substance. The acidity of a polymer can be measured according to standard techniques, for example as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity at 140° C., units are mPa-s or cPoise. In some examples, the melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic printing" or "electrophotographic printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field gradient of 50-400 V/pm, or more, in some examples 600-900 V/pm or more.

As used herein, "NVS" is an abbreviation of the term "non-volatile solids".

As used herein, "cooling without restriction" or "cooling at an uncontrolled rate" generally refers to cooling at a rate faster than about 10° C./hour, for example at least about 20° C./hour, and may include cooling via heat exchange with one or more cooling fluids or refrigerants. In contrast, and as used herein, "cooling at a controlled rate" or "controlling cooling" generally refers to cooling at a rate of 2° C./hour or less. Cooling at a controlled rate may also include cooling via heat exchange with one or more cooling fluids or refrigerants.

As used herein, the term "about" is used to provide flexibility to a numerical range endpoint by providing that a given value may be a little above or a little below the endpoint to allow for variation in test methods or apparatus. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

As used herein, unless specified otherwise, wt % values are to be taken as referring to a weight-for-weight (w/w) percentage of solids in the ink composition, and not including the weight of any liquid carrier present.

Unless otherwise stated, any feature described herein can be combined with any aspect or any other feature described herein.

In an aspect there is provided a liquid electrophotographic ink composition. The liquid electrophotographic ink composition may comprise:
  a resin;
  a liquid carrier;
  a pigment chosen from titanium oxide;
  a spacer chosen from barium sulfate, calcium carbonate, clay, magnesium silicate and mixtures thereof, in an amount from 5 to 15 wt. % of the total solids of the composition.

In another aspect there is provided a method of making a liquid electrophotographic ink composition. The method may comprise:
  heating a resin in a liquid carrier to dissolve the resin;
  mixing a pigment chosen from titanium oxide and a spacer chosen from barium sulfate, calcium carbonate, clay, magnesium silicate and mixtures thereof;
  adding the pigment and the spacer in the liquid carrier;
  controlling cooling of the liquid carrier to effect precipitation of the resin;
  grinding the liquid carrier, the resin, the pigment and the spacer to form the liquid electrophotographic ink composition, wherein the spacer is present in an amount from 5 to 15 wt. % of the total solids of the composition.

In a further aspect, there is provided a method of printing on a plastic substrate. The method may comprise:
  providing the liquid electrophotographic ink composition according to the disclosure;
  forming a latent electrostatic image on a surface;
  contacting the surface with the liquid electrophotographic ink composition such that at least some of the resin, the pigment and the spacer are transferred to the surface to form a developed toner image on the surface;
  transferring the toner image to the plastic substrate.

Much research has been carried out in recent years to try to create a white electrostatic printing ink. Some electrostatic printing inks have been produced, e.g. by grinding a white pigment with a resin, sometimes in the presence of a liquid carrier. However, some of such inks have been found to have a limited opacity at some specific ink thickness layer. Much research has been carried out by changing a certain number of parameters, notably increasing the ink thickness, increasing the pigment concentration in the ink or having a more effective pigment concentration.

The present inventors have found that a liquid electrophotographic ink composition comprising a resin, a liquid carrier, a pigment and a specific spacer has an impact on the pigment dispersion.

Liquid Electrophotographic Ink Composition

Resin

In some examples, the liquid electrophotographic ink composition comprises a resin. The resin may comprise a polymer. The polymer may comprise a thermoplastic polymer. A thermoplastic polymer is sometimes referred to as a thermoplastic resin. In some examples, the resin may comprise a polymer selected from the group consisting of alkylene acrylic acid copolymers; alkylene methacrylic acid copolymers; ethylene vinyl acetate copolymers; copolymers of ethylene or propylene, and alkyl ester of methacrylic or acrylic acid; copolymers of ethylene, acrylic or methacrylic acid and alkyl ester of methacrylic or acrylic acid; copolymers of ethylene or propylene and maleic anhydride; polyethylene; polystyrene; isotactic polypropylene; polyesters; polyvinyl toluene; polyamides; styrene/butadiene copolymers; ethylene-acrylic esters-maleic anhydride or glycidyl methacrylate terpolymers; ethylene-acrylic acid ionomers and combinations thereof. In some examples, the resin may comprise a polymer selected from ethylene or propylene acrylic acid co-polymers; ethylene or propylene methacrylic acid co-polymers; ethylene vinyl acetate co-polymers; copolymers of ethylene or propylene (e.g. 80 wt % to 99.9 wt %), and alkyl (e.g. $C_1$ to $C_5$) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. $C_1$ to $C_5$) ester of methacrylic or acrylic acid (e.g. 0.1 wt % to 20 wt %); co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylate terpolymers: ethylene-acrylic esters-maleic anhydride (MAH) or glycidyl methacrylate (GMA) terpolymers; ethylene-acrylic acid ionomers and combinations thereof.

In some examples, the resin may comprise a polymer selected from the group consisting of copolymers of alkylene acrylic acid copolymers, alkylene methacrylic acid copolymers and combination thereof. In some examples, the resin may comprise a copolymer of an alkylene monomer and a monomer selected from acrylic acid and methacrylic acid. In some examples, the liquid electrophotographic ink composition may comprise a copolymer of an alkylene monomer and an acrylic acid monomer and a copolymer of an alkylene monomer and a methacrylic acid monomer. In some examples, the alkylene monomer may be selected from ethylene and propylene.

The resin may comprise a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may comprise a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SUR-LYN® ionomers. The polymer comprising acidic side groups can be a co-polymer of ethylene and an ethylenically unsaturated acid of either acrylic or methacrylic acid, where the ethylenically unsaturated acid of either acrylic or methacrylic acid constitutes from 5 wt. % to about 25 wt. % of the copolymer, in some examples from 10 wt. % to about 20 wt. % of the copolymer.

The resin may comprise two different polymers having acidic side groups. The two polymers having acidic side groups may have different acidities, which may fall within the ranges mentioned above. The resin may comprise a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may comprise two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may comprise a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may comprise a first polymer having a melt viscosity of 15000 poise or more, in some examples 20000 poise or more, in some examples 50000 poise or more, in some examples 70000 poise or more; and in some examples, the resin may comprise a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may comprise a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is Nucrel 960 (from DuPont), and example of the second polymer is Nucrel 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the resin comprises a single type of polymer, the polymer (excluding any other components of the electrophotographic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin comprises a plurality of polymers all the polymers of the resin may together form a mixture (excluding any other components of the electrophotographic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The resin may comprise two different polymers having acidic side groups that are selected from copolymers of ethylene and an ethylenically unsaturated acid of either acrylic acid or methacrylic acid; or ionomers thereof, such as methacrylic acid and ethylene-acrylic or methacrylic acid copolymers which are at least partially neutralized with metal ions (e.g. Zn, Na, Li) such as SURLYN® ionomers. The resin may comprise (i) a first polymer that is a copolymer of ethylene and an ethylenically unsaturated acid of either acrylic acid and methacrylic acid, wherein the ethylenically unsaturated acid of either acrylic or methacrylic acid constitutes from 8 wt. % to about 16 wt. % of the co-polymer, in some examples 10 wt. % to 16 wt. % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt. % to about 30 wt. % of the co-polymer, in some examples from 14 wt. % to about 20 wt. % of the co-polymer, in some examples from 16 wt. % to about 20 wt. % of the co-polymer in some examples from 17 wt. % to 19 wt. % of the co-polymer.

The resin may comprise a polymer having acidic side groups, as described above (which may be free of ester side groups), and a polymer having ester side groups. The polymer having ester side groups may be a thermoplastic polymer. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may constitute 1% or more by weight of the total amount of the resin polymers, e.g. thermoplastic resin polymers, in the liquid electrophotographic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g.

thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the liquid electrophotographic composition and/or the ink printed on the print substrate. The polymer having ester side groups may constitute from 5% to 50% by weight of the total amount of the resin polymers, e.g. thermoplastic resin polymers, in the liquid electrophotographic composition and/or the ink printed on the print substrate, in some examples 10% to 40% by weight of the total amount of the resin polymers, e.g. thermoplastic resin polymers, in the liquid electrophotographic composition, in some examples 5% to 30% by weight of the total amount of the resin polymers, e.g. thermoplastic resin polymers, in the liquid electrophotographic composition, in some examples 5% to 15% by weight of the total amount of the resin polymers, e.g. thermoplastic resin polymers, in the liquid electrophotographic composition, in some examples 15% to 30% by weight of the total amount of the resin polymers, e.g. thermoplastic resin polymers, in the liquid electrophotographic composition.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the Nucrel family of toners (e.g. Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX76™, Nucrel 2806™, Bynell 2002, Bynell 2014, Bynell 2020 and Bynell 2022, (sold by E. I. du PONT)), the AC family of toners (e.g. AC-5120, AC-5180, AC-540, AC-580 (sold by Honeywell)), the Aclyn family of toners (e.g. Aclyn 201, Aclyn 246, Aclyn 285, and Aclyn 295), and the Lotader family of toners (e.g. Lotader 2210, Lotader, 3430, and Lotader 8200 (sold by Arkema)).

The resin can constitute about 5 to 90%, in some examples about 50 to 80%, by weight of the total solids of the liquid electrophotographic ink composition. The resin can constitute about 60 to 95%, in some examples about 70 to 95%, by weight of the total solids of the liquid electrophotographic ink composition.

Pigment

In some examples, the liquid electrophotographic ink composition comprises a pigment chosen from titanium oxide ($TiO_2$). In some examples, the pigment chosen from titanium oxide may be in the form of a particle. A form for the $TiO_2$ may be selected from rutile, anatase, brookite, and mixtures thereof, for example, the form may consist of rutile. The rutile form of $TiO_2$ exhibits the highest refractive index among the other forms of $TiO_2$. All other parameters of inks being the same, the highest refractive index yields the highest opacity. Examples of pigment particles include Sachtleben R405 from Sachtleben, and Ti-Pure® R900 from DuPont.

In some examples, the pigment particles are surface treated pigment particles. For example, the pigment particles may be organic surface treated or inorganic surface treated. In some examples, the pigment particles are surface treated to provide them with an increased hydrophobicity. In some examples, the pigment particles are surface treated with a modified polysiloxane to provide increased hydrophobicity.

In some examples, the pigment particles may have a median particle size or d50 of less than 20 μm, for example less than 15 μm, for example less than 10 μm, for example less than 5 μm, for example less than 4 μm, for example less than 3 μm, for example less than 2 μm, for example less than 1 μm, for example less than 0.9 μm, for example less than 0.8 μm, for example less than 0.7 μm, for example less than 0.6 μm, for example less than 0.5 μm. Unless otherwise stated, the particle size of the pigment particle and the coated pigment particle is determined using laser diffraction on a Malvern Mastersizer 2000 according to the standard procedure as described in the operating manual.

The pigment particle may be present in the method and/or electrophotographic ink composition in an amount of from 10 wt % to 80 wt % of the total amount of resin and pigment, in some examples 15 wt % to 80 wt %, in some examples 15 wt % to 60 wt %, in some examples 15 wt % to 50 wt %, in some examples 15 wt % to 40 wt %, in some examples 15 wt % to 30 wt % of the total amount of resin and pigment. In some examples, the pigment particle may be present in the method and/or electrophotographic ink composition in an amount of at least 50 wt % of the total amount of resin and pigment, for example at least 55 wt % of the total amount of resin and pigment. In some examples, the pigment chosen from titanium oxide may be present in an amount of 50 to 65 wt. % of the total solids of the composition.

Liquid Carrier

In some examples, the electrophotographic ink composition comprises a liquid carrier. The liquid carrier can include or be a hydrocarbon, silicone oil, vegetable oil, etc. The liquid carrier can include, for example, an insulating, non-polar, non-aqueous liquid that can be used as a medium for ink particles, i.e., the ink particles comprising the resin, the pigment and the spacer. The liquid carrier can include compounds that have a resistivity in excess of about $10^9$ ohm·cm. The liquid carrier may have a dielectric constant below about 5, in some examples, below about 3. The liquid carrier can include hydrocarbons. The hydrocarbon can include, for example, an aliphatic hydrocarbon, an isomerized aliphatic hydrocarbon, branched chain aliphatic hydrocarbons, aromatic hydrocarbons, and combinations thereof. Examples of the liquid carrier include, for example, aliphatic hydrocarbons, isoparaffinic compounds, paraffinic compounds, dearomatized hydrocarbon compounds, and the like. In particular, the liquid carrier can include, for example, Isopar-G™, Isopar-H™ Isopar-L™, Isopar-M™, Isopar-K™, Isopar-V™, Norpar12™, Norpar 13™, Norpar15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki lsosol 300™, Nisseki lsosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™).

The liquid carrier can constitute up to 35 wt. % of the liquid electrophotographic ink composition, for example, up to 34 wt. %, up to 33 wt. %, up to 32 wt. %, up to 31 wt. %, up to 30 wt. %, up to 29 wt. %, up to 28 wt. %, up to 27 wt. %, up to 26 wt. %, up to 25 wt. %, up to 24 wt. %, up to 23 wt. %, up to 22 wt. %, up to 21 wt. %, or up to 20 wt. % of the liquid electrophotographic ink composition. In some examples, the liquid carrier can constitutes 20 wt. % or more of the liquid electrophotographic ink composition, for example, 21 wt. % or more, 22 wt. % or more, 23 wt. % or more, 24 wt. % or more, 25 wt. % or more, 26 wt. % or more, 27 wt. % or more, 28 wt. % or more, 29 wt. % or more, 30 wt. % or more, 31 wt. % or more, 32 wt. % or more, 33 wt. % or more, 34 wt. % or more, or 35 wt. % or more of the liquid electrophotographic ink composition. In some examples, the liquid carrier can constitute 20 wt. % to 35 wt. % of the liquid electrophotographic ink composition, for example, 21 wt. % to 35 wt. %, 22 wt. % to 34 wt. %, 23 wt. % to 33 wt. %, 24 wt. % to 32 wt. %, 25 wt. % to 31 wt. %, 26 wt. % to 30 wt. %, or 28 wt. % to 35 wt. %.

In some examples, after diluting the liquid electrophotographic ink composition with liquid carrier, the liquid carrier can constitute about 20% to 99.5% by weight of the electrophotographic ink composition, in some examples, 50% to 99.5% by weight of the electrophotographic ink composition. In some examples, after diluting the liquid electrophotographic ink composition with liquid carrier, the liquid carrier may constitute about 40 to 90% by weight of the electrophotographic ink composition. In some examples, after diluting the liquid electrophotographic ink composition with liquid carrier, the liquid carrier may constitute about 60% to 80% by weight of the electrophotographic ink composition. In some examples, after diluting the liquid electrophotographic ink composition with liquid carrier, the liquid carrier may constitute about 90% to 99.5% by weight of the electrophotographic ink composition, in some examples, 95% to 99% by weight of the electrophotographic ink composition.

The electrophotographic ink composition, when printed on a substrate may be substantially free from liquid carrier. In an electrophotographic printing process and/or afterwards, the liquid carrier may be removed, for example, by an electrophoresis processes during printing and/or evaporation, such that substantially just solids are transferred to the substrate. Substantially free from liquid carrier may indicate that the ink printed on the substrate contains less than 5 wt. % liquid carrier, in some examples, less than 2 wt. % liquid carrier, in some examples, less than 1 wt. % liquid carrier, in some examples, less than 0.5 wt. % liquid carrier. In some examples, the ink printed on the substrate is free from carrier liquid.

Spacer

The liquid electrophotographic ink composition may include a spacer chosen from barium sulfate, calcium carbonate, clay, magnesium silicate and mixtures thereof, in an amount from 5 to 15 wt. % of the total solids of the composition.

In some examples, the spacer may be barium sulfate. In some examples, barium sulfate may be Blanc Fixe©.

In some examples, barium sulfate may be in the form of particle having a median particle size ($d_{50}$) ranging from 500 nm to 900 nm. In some examples, barium sulfate may be in the form of particle having a median particle size ($d_{50}$) ranging from 650 nm to 750 nm. The particle size of barium sulfate is determined using Brookhaven X-Ray Disc Centrifuge Particle Size Analyzer.

In some examples, barium sulfate may be in the form of particle having a median particle size ($d_{50}$) ranging from 10 nm to 70 nm. The particle size of barium sulfate is determined using Brookhaven X-Ray Disc Centrifuge Particle Size Analyzer.

In some examples, the spacer may be present in an amount from 5 to 10 wt. % of the total solids of the composition.

Charge Adjuvant

The liquid electrophotographic ink composition can include a charge adjuvant. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g. Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock co-polymers of 2-ethylhexyl methacrylate-co-methacrylic acid calcium, and ammonium salts, co-polymers of an alkyl acrylamidoglycolate alkyl ether (e.g. methyl acrylamidoglycolate methyl ether-co-vinyl acetate), and hydroxy bis(3,5-di-tert-butyl salicylic) aluminate monohydrate. In some examples, the charge adjuvant is aluminium di and/or tristearate and/or aluminium di and/or tripalmitate.

The charge adjuvant can constitute about 0.1 to 5% by weight of the total solids of the liquid electrophotographic ink composition. The charge adjuvant can constitute about 0.5 to 4% by weight of the total solids of the liquid electrophotographic ink composition. The charge adjuvant can constitute about 1 to 3% by weight of the total solids of the liquid electrophotographic ink composition.

Other Additives

The liquid electrophotographic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Method of Making the Liquid Electrophotographic Ink Composition

In some examples, the method of making a liquid electrophotographic ink composition may involve heating a dispersion of a resin in a liquid carrier to dissolve the resin, and then mixing a pigment chosen from titanium oxide and a spacer chosen from barium sulfate, calcium carbonate, clay, magnesium silicate and mixtures thereof, adding the pigment and the spacer in the liquid carrier, and controlling cooling of the liquid carrier to effect precipitation of the resin, and grinding the liquid carrier, the resin, the pigment and the spacer to form the liquid electrophotographic ink composition, wherein the spacer is present in an amount from 5 to 15 wt. % of the total solids of the composition.

Figure 1:
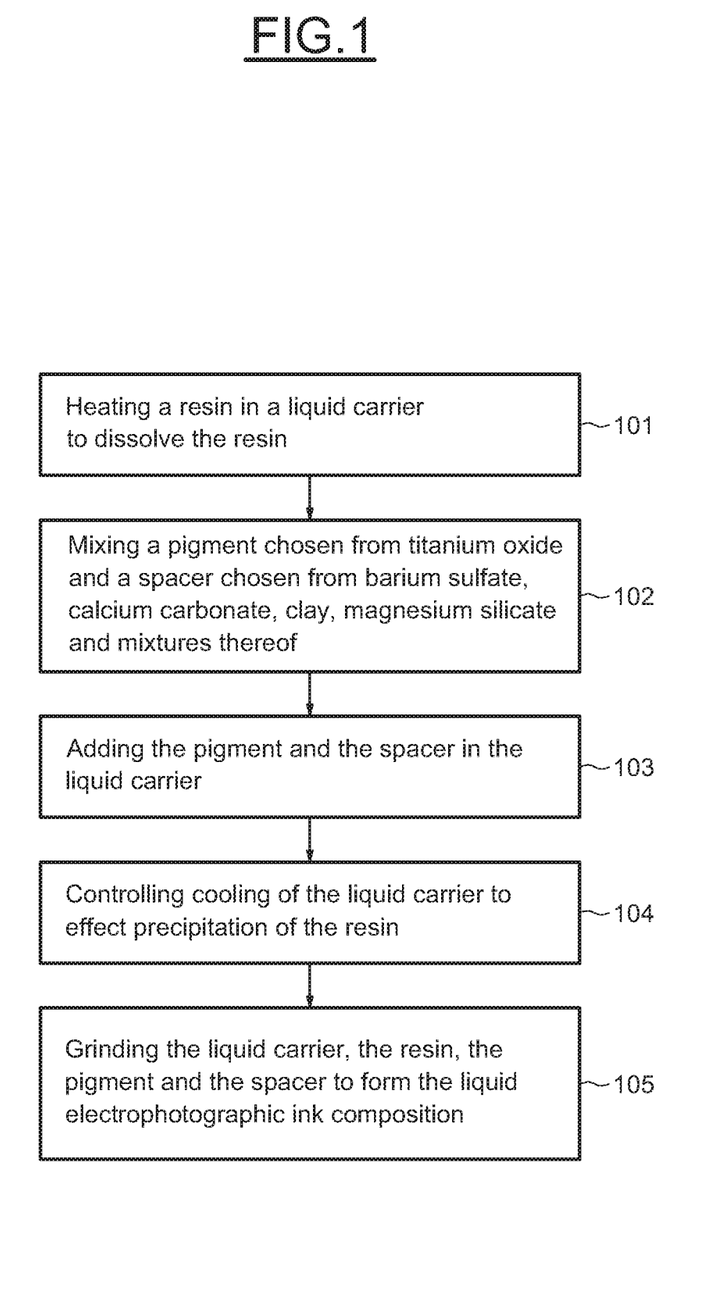
FIG. 1 is a schematic flow chart showing the processes involved in one example of a fabrication method of the ink composition described herein.

FIG. 1 is flowchart showing the process involved in one example of a method of making a liquid electrophotographic ink composition described herein. The method may comprise heating a resin in a liquid carrier to dissolve the resin (101). The method may further comprise mixing a pigment chosen from titanium oxide and a spacer chosen from barium sulfate, calcium carbonate, clay, magnesium silicate and mixtures thereof (102). Subsequently, the method may further comprise adding the pigment and the spacer in the liquid carrier (103).

The method may further comprise controlling cooling of the liquid carrier to effect precipitation of the resin (104). The method may further comprise grinding the liquid carrier, the resin, the pigment and the spacer to form the liquid electrophotographic ink composition according to the disclosure (105).

In some examples, the method of making a liquid electrophotographic ink composition involves heating a dispersion of a resin in a liquid carrier to dissolve the resin. In some examples, the resin is insoluble in the liquid carrier at room temperature but soluble in the liquid carrier at elevated temperatures, for example at a temperature of at least 50° C., for example at a temperature of at least 60° C., for example at a temperature of at least 70° C., for example at a temperature of at least 80° C., for example at a temperature of at least 90° C., for example at a temperature of at least 100° C., for example at a temperature of at least 110° C., for example at a temperature of at least 120° C. The dispersion of the resin in the liquid carrier may be heated to any of the above stated temperatures for sufficient time until the resin has dissolved. Dissolution may be confirmed by the liquid carrier appearing clear and homogenous. In some examples, the dispersion of the resin in the liquid carrier may be mixed at a rate of less than 500 rpm, for example less than 400 rpm, for example less than 300 rpm, for example less than 200 rpm until dissolution is complete. In some examples, heating a dispersion of resin in liquid carrier causes the resin to swell with liquid carrier. In some examples, the dispersion of resin in liquid carrier is heated to swell the resin.

In some examples, the liquid carrier may be heated to at least 100° C. to dissolve the resin.

In some examples, the liquid carrier may be or may comprise an isoparaffinic liquid carrier.

In some examples, the pigment and the spacer may be suspended in the liquid carrier before any cooling occurs, for example at the temperature at which dissolution of the resin in the liquid carrier was carried out. In some examples, the liquid carrier may be cooled to an intermediate temperature before the pigment and the spacer are suspended in the liquid carrier. The intermediate temperature may be any temperature above the cloud point of the solution comprising the liquid carrier and the dissolved resin. The cloud point of any given liquid carrier-resin system can be readily determined by heating and slowly cooling the solution and is the temperature at which dissolved solids begin to precipitate, giving a phase separation and a cloudy or turbid appearance. In some examples, the solution comprising the liquid carrier and the dissolved resin is cooled to at least 2° C., for example at least 3° C., for example at least 4° C., for example at least 5° C., for example at least 6° C., for example at least 7° C., for example at least 8° C., for example at least 9° C., for example at least 10° C. above the cloud point before the pigment and the spacer are suspended in the liquid carrier.

In some examples, the spacer may be chosen from barium sulfate.

In some examples, the pigment and the spacer are mixed into the solution of the resin dissolved in the liquid carrier at a shear rate of 12 000 rpm or less, for example 11 000 rpm or less, for example 10 000 rpm or less, for example 9000 rpm or less to ensure complete dispersion before the precipitation of the resin is effected. In other examples, the pigment and the spacer are mixed into the solution of the resin dissolved in the liquid carrier at a shear rate of 100 rpm or less, for example 90 rpm or less, for example 80 rpm or less, for example 70 rpm or less, for example 60 rpm or less, for example 50 rpm or less to ensure complete dispersion before the precipitation of the resin is effected. In some examples, following dispersion of the pigment and the spacer at a low shear rate, the rate of mixing may be increased to less than 100 rpm, for example less than 90 rpm, for example less than 80 rpm, for example 70 rpm or less. In some examples, following dispersion of the pigment and the spacer, the rate of mixing may be lowered to less than 500 rpm, for example less than 400 rpm, for example less than 300 rpm, for example less than 200 rpm, for example 100 rpm or less, for example less than 90 rpm, for example less than 80 rpm, for example less than 70 rpm, for example less than 60 rpm, for example 50 rpm or less while precipitation is effected.

In some examples, precipitation is effected through controlled cooling through the cloud point of the resin-liquid carrier system. For example, the controlled cooling at a rate of less than 2° C./hour may be carried out beginning at a temperature of 5° C. above the cloud point of the solution and continued until a temperature of at least 5° C. below the cloud point of the solution. In some examples, once the temperature has been lowered in a controlled manner to at least 5° C. below the cloud point of the solution, the system is then cooled at an uncontrolled rate to room temperature.

In some examples, following precipitation of the resin from the liquid carrier, the composition comprising the resin, the pigment and the spacer in liquid carrier may be subjected to a grinding treatment. The grinding treatment may comprise grinding the composition at a temperature of less than 100° C., for example less than 90° C., for example less than 80° C., for example less than 70° C., for example less than 60° C., for example less than 50° C., for example 40° C. or less. The grinding treatment may comprise grinding the composition at a speed of less than 500 rpm, for example less than 400 rpm, for example less than 300 rpm, for example 250 rpm or less. The grinding treatment may comprise grinding the composition at a NVS content of less than 40%, for example less than 30%, for example less than 20%, for example 18% or less. The grinding treatment may comprise grinding the composition for less than 12 hours, for example less than 6 hours, for example less than 5 hours, for example less than 4 hours, for example less than 3 hours, for example 2 hours or less. The grinding treatment may comprise grinding the composition until a desired particle size is obtained.

The grinding may be carried out on any commercial attritor. The grinding may be carried out using a metallic grinding media, or a non-metallic grinding media. The grinding media may be or comprise carbon steel, or chrome steel, or stainless steel, or steel shot. The grinding media may be or comprise alumina or other ceramic material such as glass mullite silicon carbide silicon nitride, tungsten carbide zirconium oxide, or zirconium silicate. The grinding media may be or comprise spherical or substantially spherical media, satellites or radius-end cylinders. Satellites will be understood as being substantially spherical with a protruding band around the circumference. The grinding media may be 35 mm or less in diameter, 31 mm or less in diameter, 30 mm or less in diameter, for example 26 mm or less, 25 mm or less, 15 mm or less, 12.7 mm or less in diameter, 10 mm or less, for example 9.5 mm or less, 7.9 mm or less, 5.6 mm or less, 6.4 mm or less, 3.9 mm or less, 3.2 mm or less, 2.4 mm or less, 2 mm or less, for example 1.7 mm or less, 1.4 mm or less, 1 mm or less, 1.18 mm or less, 0.7 mm or less, 0.6 mm or less, 0.5 mm or less, 0.4 mm or less, or 0.25 mm or less in diameter.

The present disclosure also relates to a method of printing on a plastic substrate, the method may comprising:
  providing the liquid electrophotographic ink composition according to the present disclosure;
  forming a latent electrostatic image on a surface;
  contacting the surface with the liquid electrophotographic ink composition such that at least some of the resin, the pigment and the spacer are transferred to the surface to form a developed toner image on the surface;
  transferring the toner image to the plastic substrate.

Figure 2:
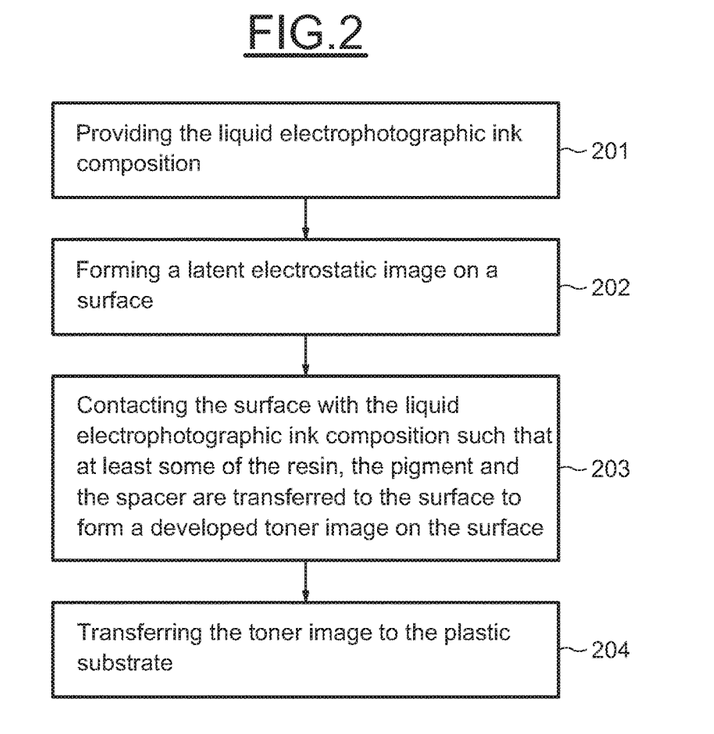
FIG. 2 is a schematic flow chart showing the processes involved in one example of a printing method.

FIG. 2 is flowchart showing the process involved in one example of a printing method. The method may comprise providing the liquid electrophotographic ink composition according to the present disclosure (201). The method may further comprise forming a latent electrostatic image on a surface (202). Subsequently, the method may further comprise contacting the surface with the liquid electrophotographic ink composition such that at least some of the resin, the pigment and the spacer are transferred to the surface to form a developed toner image on the surface (203). The method may further comprise transferring the toner image to the plastic substrate (204).

The surface on which the latent electrostatic image is formed may be on a rotating member, e.g. in the form of a cylinder. The surface on which the latent electrostatic image is formed may form part of a photo imaging plate (PIP). The intermediate transfer member may be a rotating flexible member, which may be heated, e.g. to a temperature of from 80 to 130° C. The print substrate may be or comprise a cellulosic print substrate such as paper. The cellulosic print substrate may be or comprise an uncoated cellulosic print substrate, i.e. absent of a coating of a polymeric material. The print substrate may be an acrylic print substrate, in some examples a coated acrylic print substrate, e.g. coated with a styrene-butadiene co-polymer.

EXAMPLES

The following illustrates examples of the methods and other aspects described herein. Thus, these Examples should not be considered as limitations of the present disclosure, but are merely in place to teach how to make examples of the present disclosure.

Materials

Resins: Nucrel® 699: a copolymer of ethylene and methacrylic acid, made with nominally 11 wt. % methacrylic acid (available from DuPont). A-C® 5120: a copolymer of ethylene and acrylic acid with an acrylic acid content of 15 wt. % (available from Honeywell).

Liquid Carrier: Isopar© L: an isoparaffinic oil comprising a mixture of $C_{11}$-$C_{13}$ isoalkanes (produced by Exxon Mobil; CAS number 64742-48-9).

Pigment: Ti-Pure® R900: a rutile $TiO_2$ pigment (available from DuPont).

Spacer: Blanc Fixe© (Sachtleben); median particle size ($d_{50}$): 700 nm.

Charge Adjuvant: VCA indicates an aluminium tristearate and palmitate salt, available from Sigma-Aldrich.

Voltage Scan Test Description

Voltage scan experimental technique is based on Developer/Electrode voltage variation with a certain resolution, and enables to measure OD (Optical Density)/Background vs Developer/Electrode voltage dependence, so that the working window (Developer/Electrode voltage range) might be defined. Background of transparent substrate (BOPP/PET 12 μm) is subtracted while measuring the one from the exemplified ink. Measured separately (linear) correlation between Optical Density and Opacity, determine Background vs Opacity dependence. Spec (upper limit) for Background level is 0.1 for 2 hits.

DMA Understanding Test Description

In order to estimate ink consumption, two-dimensional object—mass per unit area (DMA, Density Mass per Area) is measured. During this test (OD/Opacity), uniformity and stability, determining the homogeneity of the ink layer, are crucial and are controlled during the test; monitors for OD measurements for the first and last layers are printed. DMA test consists from experimentally defined (minimal) amount separations of white, printed on one layer of black. The first printed layer (black layer) together with the substrate Kromekote are used for easier release of the tested sample. After printing, the sample is carefully peeled and then baked during 5 hours at temperature 150° C. and weighted. Measured separately (linear) correlation between OD and Opacity enables to define DMA vs Opacity curve. At least three different OD targets are used for plotting DMA vs. OD (and thus opacity) dependence.

Comparative Example

Ink Composition Formulation:

Resins percentage 30% w/w based Nucrel® 699:A-C® 5120 80:20 mixture respectively;

Pigment percentage 70 w/w based Ti-pure® R900 $TiO_2$ pigment.

Ink Composition Production:

Stage 1: Precipation Process

To Bachiller 7 L volume, Isopar© L (mineral oil; 2.62 g), Nucrel® 699 (0.805 g) and A-C 5120 (0.203 g) are added at room temperature (RT). The Bachiller mixer has a central mixing system and a rotor-stator system which can be operated simultaneously.

The resins and mineral oil mixture is heated to 135° C. for 70 min at 200 rpm.

The mixture is cooled to 125° C. over 20 min.

The pigment (2.38 g) is added gradually at rate of 40 g/min, while staying at temperature range of 100-120° C. At this stage the rotor stator is operating at 2000 rpm, in addition to the regular mixing.

The mixture is then cooled to 83° C. in cooling rate of 12° C./h and a mixing rate of 200 rpm. At this stage the rotor stator is operating at 2000 rpm, in addition to the regular mixing.

The mixture is then cooled to 70° C. at a cooling rate of 1.5° C./h and a mixing rate of 120 rpm.

This forms a composition at 56 wt. % solids in mineral oil.

Isopar© L (1.05 g) is then added to the reactor to dilute the mixture to 48 wt. % solids while mixing at 150 rpm. The rotor stator is operated at 500 rpm.

Additional Isopar© L (0.47 g) is added to the reactor to dilute the mixture to 45 wt. % solids while mixing at 150 rpm. The rotor stator is operated at 500 rpm.

Additional Isopar© L (0.54 g) is added to the reactor to dilute the mixture to 42 wt. % solids while mixing at 150 rpm. The rotor stator is operated at 1000 rpm.

This forms a precipitated ink composition at 42 wt. % solids.

Stage 2: Grinding Process 5 kg of the precipitated ink composition at 42% solids is added to a Buhler K8 grinder at constant volume.

VCA (17 g) is added to the mixture.

The mixture is grinded at 100% pump flow and 1000 rpm grinding speed. At this stage, the temperature is controlled to maintain a temperature of 53° C. or below by using the chiller infrastructure.

The total grinding process time is 4 h.

The obtained ink composition is named ink no. 1.

Example 1

Ink Composition Formulation:

Resins percentage 30% w/w based Nucrel® 699:A-C® 5120 80:20 mixture respectively;

Pigment percentage 65% w/w based Ti-pure® R900 $TiO_2$ pigment;

Barium sulfate percentage 5% w/w Blanc Fixe©.

Ink Composition Production:

Stage 1: Precipitation Process

To Bachiller 7 L volume, Isopar© L (mineral oil; 2.62 g), Nucrel® 699 (0.805 g) and A-C 5120 (0.203 g) are added at room temperature (RT). The Bachiller mixer has a central mixing system and a rotor-stator system which can be operated simultaneously.

The resins and mineral oil mixture is heated to 135° C. for 70 min at 200 rpm.

The mixture is cooled to 125° C. over 20 min.

In a mixer tool, the pigment (2.21 g) and the spacer (0.17 g) are mixed well for 0.5 hour.

The pigment mixture (2.38 g) is added gradually at rate of 40 g/min, while staying at temperature range of 100-120° C. At this stage the rotor stator is operating at 2000 rpm, in addition to the regular mixing.

The mixture is then cooled to 83° C. in cooling rate of 12° C./h and a mixing rate of 200 rpm. At this stage the rotor stator is operating at 2000 rpm, in addition to the regular mixing.

The mixture is then cooled to 70° C. at a cooling rate of 1.5° C./h and a mixing rate of 120 rpm.

The mixture is then cooled to 43° C. at a cooling rate of 6° C./h and a mixing rate of 150 rpm.

This forms a composition at 56 wt. % solids in mineral oil.

Isopar© L (1.05 g) is then added to the reactor to dilute the mixture to 48 wt. % solids while mixing at 150 rpm. The rotor stator is operated at 500 rpm.

Additional Isopar© L (0.47 g) is added to the reactor to dilute the mixture to 45 wt. % solids while mixing at 150 rpm. The rotor stator is operated at 500 rpm.

Additional Isopar© L (0.54 g) is added to the reactor to dilute the mixture to 42 wt. % solids while mixing at 150 rpm. The rotor stator is operated at 1000 rpm.

This forms a precipitated ink composition at 42 wt. % solids.

Stage 2: Grinding Process 5 kg of the precipitated ink composition at 42% solids is added to a Buhler K8 grinder at constant volume.

VCA (17 g) is added to the mixture.

The mixture is grinded at 100% pump flow and 1000 rpm grinding speed. At this stage, the temperature is controlled to maintain a temperature of 53° C. or below by using the chiller infrastructure.

The total grinding process time is 4 h.

The obtained ink composition is named ink no. 2.

It is mentioned that another ink has been produced through the same process than the one used for producing ink no. 2 with the exception that the spacer Blanc Fixe© (Sachtleben) has been replaced with barium sulfate—Sachtoperse (Sachtleben) having a median particle size ($d_{50}$): 40 nm. This ink is named ink no. 3 and is according to the disclosure.

Results

Voltage Scan Results

Figure 3:
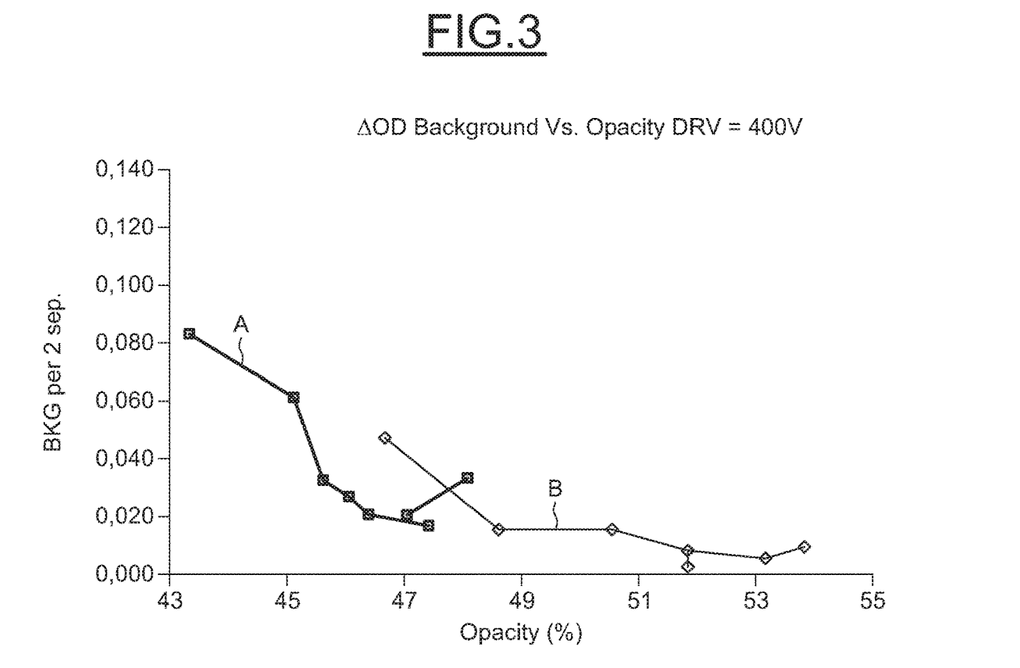
FIG. 3 shows press test background and optical density results of example 1 against a comparative example.

Thanks to FIG. 3, the opacity of ink no. 1, corresponding to curve A, and ink no. 2, corresponding to curve B, can be observed. At DRV 400V; ELV 800V (point 3 from the left on the curves), the opacity for ink no. 1 is 45.5% while the opacity for ink no. 2 is 50.5%. As such, the delta opacity between the inks is 5%.

It is not mentioned on FIG. 3 but ink no. 3 and ink no. 2 have similar opacity.

It is also observed on FIG. 3 that ink no. 2 has lower background issue relative to ink no. 1. It is to be reminded that the background specification for white standard ink is 0.07.

Therefore, it is shown that the ink according to the disclosure (example 1; ink no. 2) has higher opacity than the comparative ink (comparative example; ink no. 1).

A clear shift of the opacity is observed when comparing opacities of the exemplified inks, indicating an improvement in pigment dispersion.

DMA Results

The DMA results are shown in Table 1 below. Measurement is made at 49% opacity. It is observed that the ink thickness layer for ink no. 1 and ink no. 2 is the same.

TABLE 1

| Ink n° | DMA (mg/cm2) | DMA reduction (%) |
|---|---|---|
| 1 | 0.146 | — |
| 2 | 0.136 | −6.8 |

A clear DMA reduction can be observed regarding ink no. 2 (ink according to the disclosure) in comparison with ink no. 1 (comparative ink). This also indicates an improvement in pigment dispersion.

It is to be also mentioned that ink no. 3 and ink no. 2 have similar DMA reduction.

Therefore, the ink opacity has been improved, indicating an improvement in pigment dispersion, while conserving the same ink thickness layer.

While the compositions, methods and related aspects have been described with reference to certain examples, those skilled in the art will appreciate that various modifications, changes, omissions, and substitutions can be made without departing from the spirit of the disclosure. It is intended, therefore, that the invention be limited by the scope of the following claims. The features of any dependent claim may be combined with the features of any of the other dependent claims and/or any of the independent claims.

What is claimed is:

1. A liquid electrophotographic ink composition, consisting of:
   a resin;
   a liquid carrier;
   a pigment chosen from titanium oxide;
   a spacer selected from the group consisting of barium sulfate, clay, magnesium silicate, and mixtures thereof, the spacer being present in an amount from 5 to 15 wt. % of the total solids of the composition;
   optionally, a charge adjuvant selected from the group consisting of aluminum distearate, aluminum tristearate, aluminum dipalmitate, aluminum tripalmitate, and combinations thereof; and
   optionally, an additive selected from the group consisting of waxes, surfactants, biocides, organic solvents, viscosity modifiers, pH adjusters, sequestering agents, preservatives, compatibility additives, emulsifiers, and combinations thereof.

2. The liquid electrophotographic ink composition of claim 1, wherein the resin comprises a polymer selected from the group consisting of alkylene acrylic acid copolymers; alkylene methacrylic acid copolymers; ethylene vinyl acetate copolymers; copolymers of ethylene or propylene, and alkyl ester of methacrylic or acrylic acid; copolymers of ethylene, acrylic or methacrylic acid and alkyl ester of methacrylic or acrylic acid; copolymers of ethylene or propylene and maleic anhydride; polyethylene; polystyrene; isotactic polypropylene; polyesters; polyvinyl toluene; polyamides; styrene/butadiene copolymers; ethylene-acrylic esters-maleic anhydride or glycidyl methacrylate terpolymers; ethylene-acrylic acid ionomers and combinations thereof.

3. The liquid electrophotographic ink composition of claim 1, wherein the resin comprises a polymer having acidic side groups.

4. The liquid electrophotographic ink composition of claim 1, wherein the resin comprises a polymer selected from the group consisting of copolymers of alkylene acrylic acid copolymers; alkylene methacrylic acid copolymers and combination thereof.

5. The liquid electrophotographic ink composition of claim 1, wherein the spacer is barium sulfate.

6. The liquid electrophotographic ink composition of claim 5, wherein barium sulfate is in the form of particle having a median particle size (d50) ranging from 500 nm to 900 nm.

7. The liquid electrophotographic ink composition of claim 5, wherein barium sulfate is in the form of particle having a median particle size (d50) ranging from 650 nm to 750 nm.

8. The liquid electrophotographic ink composition of claim 5, wherein barium sulfate is in the form of particle having a median particle size (d50) ranging from 10 nm to 70 nm.

9. The liquid electrophotographic ink composition of claim 1, wherein the spacer is present in an amount from 5 to 10 wt. % of the total solids of the composition.

10. The liquid electrophotographic ink composition of claim 1, wherein the pigment chosen from titanium oxide is present in an amount of 50 to 65 wt. % of the total solids of the composition.

11. A method of making the liquid electrophotographic ink composition of claim 1, the method comprising:
    heating the resin in the liquid carrier to dissolve the resin;
    mixing the pigment and the spacer;
    adding the pigment and the spacer in the liquid carrier;
    controlling cooling of the liquid carrier to effect precipitation of the resin;
    grinding the liquid carrier, the resin, the pigment and the spacer to form the liquid electrophotographic ink composition.

12. The method of claim 11, wherein the liquid carrier is heated to at least 100° C. to dissolve the resin.

13. The method of claim 11, wherein the liquid carrier is or comprises an isoparaffinic liquid carrier.

14. The method of claim 11, wherein the spacer is chosen from barium sulfate.

15. A method of printing on a plastic substrate, the method comprising:
    providing the liquid electrophotographic ink composition of claim 1;
    forming a latent electrostatic image on a surface;
    contacting the surface with the liquid electrophotographic ink composition such that at least some of the resin, the pigment and the spacer are transferred to the surface to form a developed toner image on the surface; and
    transferring the toner image to the plastic substrate.

* * * * *